US007916507B2

(12) United States Patent
Birnbach (10) Patent No.: US 7,916,507 B2
(45) Date of Patent: Mar. 29, 2011

(54) HIGH VOLTAGE ELECTRON TUBE INVERTER WITH INDIVIDUAL OUTPUT PHASE CURRENT CONTROL

(75) Inventor: Curtis A. Birnbach, New Rochelle, NY (US)

(73) Assignee: Advanced Fusion Systems, LLC, White Plains, NY (US)

( * ) Notice: Subject to any disclaimer, the term of this patent is extended or adjusted under 35 U.S.C. 154(b) by 232 days.

(21) Appl. No.: 12/359,198

(22) Filed: Jan. 23, 2009

(65) Prior Publication Data

US 2009/0190383 A1  Jul. 30, 2009

Related U.S. Application Data

(60) Provisional application No. 61/062,154, filed on Jan. 24, 2008.

(51) Int. Cl.
*H02M 3/33* (2006.01)
*H02M 7/533* (2006.01)

(52) U.S. Cl. ............. 363/31; 363/99; 363/120; 363/122

(58) Field of Classification Search .................. 323/212; 363/23, 29, 31, 35, 38, 71, 97, 99, 111, 120–122, 363/133

See application file for complete search history.

(56) References Cited

U.S. PATENT DOCUMENTS

| 3,916,246 | A | * | 10/1975 | Preist ................................ 315/5 |
| 4,124,886 | A | * | 11/1978 | Black et al. .................... 363/121 |
| 4,450,577 | A | * | 5/1984 | Sato et al. ...................... 378/109 |
| 4,950,962 | A | | 8/1990 | Birnbach |
| 5,666,278 | A | * | 9/1997 | Ng et al. .......................... 363/71 |
| 5,852,554 | A | * | 12/1998 | Yamamoto ....................... 363/71 |
| 5,896,281 | A | * | 4/1999 | Bingley ........................... 363/71 |
| 5,929,557 | A | | 7/1999 | Makishima et al. |
| 7,046,526 | B2 | * | 5/2006 | Toda et al. ....................... 363/24 |
| 2004/0197649 | A1 | | 10/2004 | Clarke et al. |
| 2005/0207189 | A1 | | 9/2005 | Chen |
| 2007/0041221 | A1 | | 2/2007 | Phadke et al. |
| 2008/0049468 | A1 | * | 2/2008 | Wei et al. ........................ 363/71 |

OTHER PUBLICATIONS http://en.wikipedia.org/wiki/High-voltage_direct_current.
http://en.wikipedia.org/wiki/Flip-flop.

* cited by examiner

*Primary Examiner* — Jeffrey L Sterrett
*Assistant Examiner* — Fred E Finch, III
(74) *Attorney, Agent, or Firm* — Bruzga & Associates; Charles E. Bruzga (57) ABSTRACT

Disclosed is a high voltage inverter for converting DC power to AC power with one or more AC output phases. The inverter has for each AC output phase an AC input phase circuit comprising first and second cold cathode field emission controllable electron tubes of triode, tetrode or pentode structure. Each electron tube has a first input node for connection to a high voltage DC potential in excess of 20 KV and a second input node for connection to ground. First electron tube is serially connected between a first end of a primary winding and ground, and second electron tube is serially connected between a second end of the primary winding and ground. Control circuitry controls the electron tubes so that the first and second electron tubes alternatively conduct so as to alternately bring the first and then second end of the primary winding approximately to the potential of ground.

7 Claims, 7 Drawing Sheets

HIGH VOLTAGE ELECTRON TUBE INVERTER WITH INDIVIDUAL OUTPUT PHASE CURRENT CONTROL

CROSS-REFERENCE TO RELATED APPLICATIONS

This application claims priority from U.S. Provisional Application No. 61/062,154 filed Jan. 24, 2008 for Method and Apparatus for Conversion of High Voltage Direct Current into High Voltage Alternating Current using Cold Cathode Triodes by Curtis A. Birnbach.

FIELD OF THE INVENTION

The present invention relates to inverters including the function of converting DC power to AC power, and more particularly to high voltage inverters wherein input DC voltages exceed 20 KV.

BACKGROUND OF THE INVENTION

Prior art inverter technologies for converting DC at voltages exceeding 20 KV to AC power include Mercury vapor tubes and solid state devices. Both technologies have drawbacks that would be desirable to avoid.

Mercury vapor tubes have the drawback of being environmentally dangerous if the mercury vapor in the tubes escapes into the environment. Solid state devices have the drawback of comprising large banks of many parallel connected, solid state devices such as thyristors (e.g., silicon-controlled rectifiers). Apart from the cost factor and complications of requiring many parallel-connected devices, reliability is reduced because the probability of one of many component devices failing greatly exceeds the probability of a single device failing—assuming the failure rate per device is the same.

It would be desirable to provide a high voltage inverter including the function of converting DC power to AC power that can have a low number of parts, exhibits high reliability, and is not environmentally dangerous.

BRIEF DESCRIPTION OF THE DRAWINGS

In the drawings, in which like reference numerals refer to like parts.

SUMMARY OF THE INVENTION

The present invention provides, in a preferred form, a high voltage inverter for converting DC power to AC power with one or more AC output phases. The inverter has for each AC output phase an AC input phase circuit comprising first and second cold cathode field emission controllable electron tubes of triode, tetrode or pentode structure. Each electron tube has a first input node for connection to a high voltage DC potential in excess of 20 KV and a second input node for connection to a ground. A primary transformer winding has a first end, a second end, and a center tap. The first electron tube is serially connected between the first end of the primary winding and the ground, and the second electron tube is serially connected between the second end of the primary winding and the ground. Control circuitry controls the electron tubes so that the first and second electron tubes alternatively conduct so as to alternately bring the first end of the primary winding approximately to the potential of the ground and bring the second end of the primary winding approximately to the potential of the ground.

Preferred embodiments of the foregoing inverter include the function of converting DC power to AC power, while having a low number of parts, exhibiting high reliability, and not being environmentally dangerous.

DETAILED DESCRIPTION OF THE INVENTION

Figure 1:
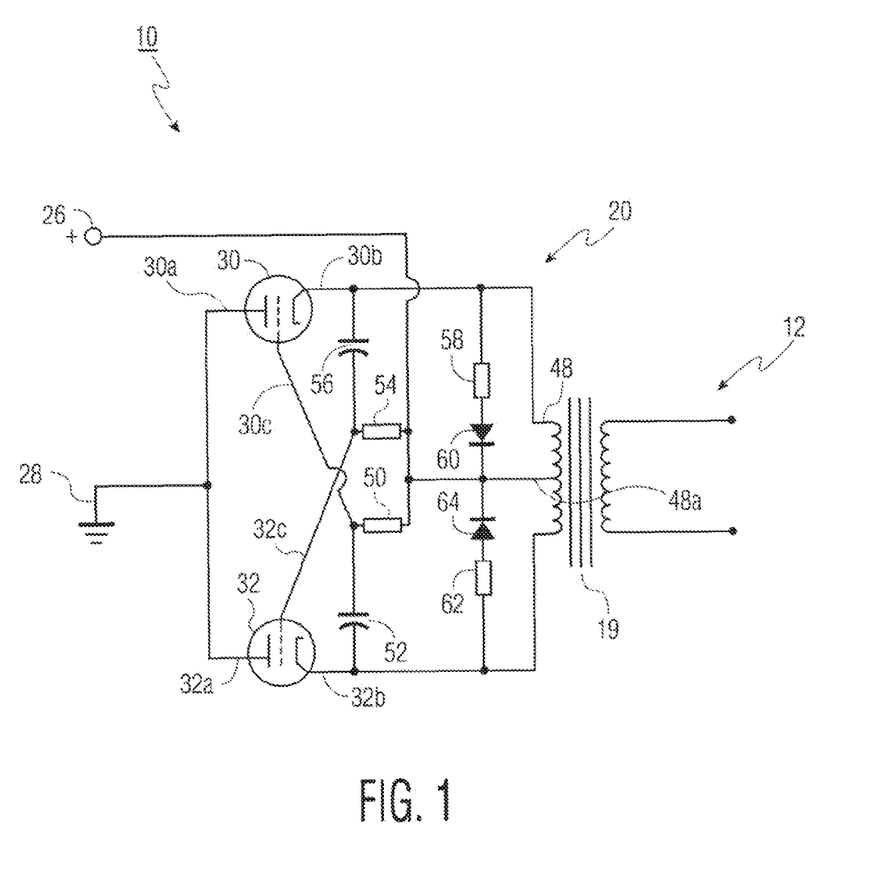
FIG. 1 is a schematic diagram of a high voltage inverter for converting DC power to AC power in accordance with a preferred embodiment of the present invention.

FIG. 1 shows a preferred high voltage inverter 10 for converting high voltage DC to AC current. The output of inverter 10 preferably provides a voltage in excess of 10 KV and with an AC frequency in the range of from about 50 to 400 cycles per second. Input AC phase 20 converts to AC high voltage DC that is supplied between input node 26 and a ground 28.

The following description covers the areas of (1) AC input phases of the high voltage inverter of the present invention, (2) a high voltage inverter incorporating phase synchronization, and phase monitoring and power balancing of an electrical power distribution grid, and (3) a high voltage DC to DC inverter.

1. AC Input Phase

Figure 2:
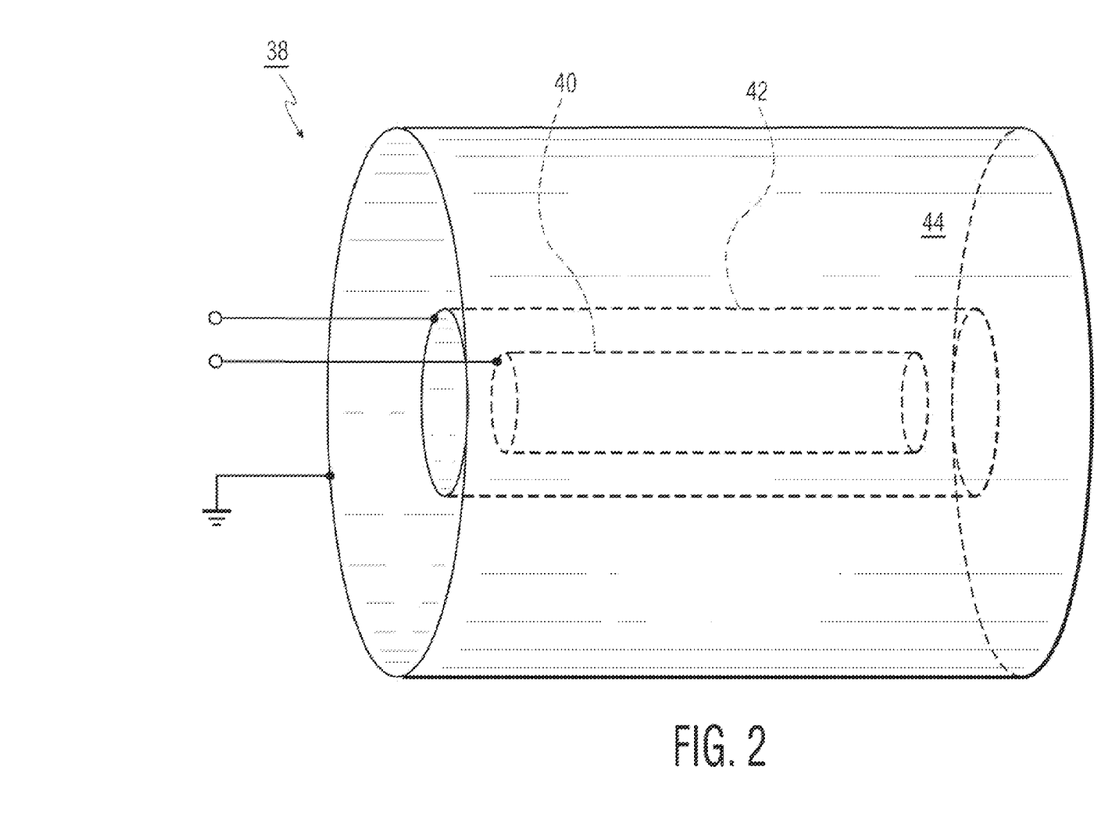
FIG. 2 is a simplified perspective view of a cold cathode field emission controllable electron tube of triode structure that may be used in the present invention.

Input AC phase 20 of FIG. 1 includes cold cathode field emission controllable electron tubes 30 and 32 of triode structure. Alternatively, such electron tubes could be replaced with tubes of tetrode or pentode structure with appropriate adjustments to the circuitry as would be obvious to a person of ordinary skill in the art. FIG. 2 shows a preferred cold cathode field emission controllable electron tube 38 of triode structure. In FIG. 2, tube 38 includes a cylindrical cathode 40 encircled by a cylindrical grid 42, which in turn is encircled by a cylindrical anode 44. Cathode 40, grid 42 and anode 44 are axisymmetrically arranged with each other along their central cylindrical axes. Further details of tube 38 can be found in U.S. Pat. No. 4,950,962 issued on Aug. 21, 1990 and entitled "High Voltage Switch Tube." The entirety of the disclosure of the foregoing patent is incorporated herein by reference. The time constants of the circuit disclosed in the foregoing patent are adjusted to provide a switching rate that is sufficiently high to allow efficient use of the transformer coupled output of inverter 10 of FIG. 1.

High voltage inverter 10 FIG. 1 preferably uses the foregoing cold cathode field emission controllable electron tube 38 of FIG. 2 and the foregoing U.S. Pat. No. 4,950,962. This is due to the combination of qualities of electron tube 38 of high voltage capacity, high current capacity and high thermal dissipation. For power generating station and transmission line applications of high voltage inverter 10, it is both possible and practical to build electron tubes like electron tube 38 which will operate continuously at voltages in excess of 20 KVDC (e.g., 1 million VDC). In power transmission applications, typical continuous currents are in the KiloAmpere range. If inverter 10 of FIG. 1 is used as a power generating station, other cold cathode field emission controllable electron tubes can be used in inverter 10 of FIG. 1, as long as they are designed to operate continuously in the demanding environment of a power generating station.

Assuming a 10 KiloAmpere continuous current (approximately 5 times the largest, contemporary HVDC transmission line) and assuming use of electron tube 38 of FIG. 2 and above-mentioned U.S. Pat. No. 4,950,962, spacings between cathode 40, grid 42 and anode 44 would meet certain geometrical requirements. Typically, for instance, the ratio of spacing of anode 44 to grid 42 to the spacing of grid 42 to cathode 40 may be about 10 to 1. Selection of such spacings will be obvious to persons of ordinary skill in the art based on the present disclosure. Anode 44 may be formed as the inside surface of a liquid-cooled jacket for thermal control. Cathode 40 and grid 42 can also be cooled if required. As an extreme example, an inverter with a capacity of 5 GigaWatts, which is much higher than any realistic application, exhibits the combination of substantial power handling capacity versus compact size. This is a fraction of the size of existing technology devices, which are mostly thyristors and mercury vapor tubes.

In FIG., the DC input voltage appears between node 26 and ground 28 exceeds 20 KV. AC input phase 20 includes electron tubes 30 and 32 as described above, with their anodes 30a and 32a connected to ground 28. Cathode 30b of electron tube 30 is connected to a first end of a primary transformer winding 48, shown as the upper end of the winding. Cathode 32b of electron tube 32 is similarly connected to a second end of primary transformer winding 48, shown as the lower end of the winding. Grids 30c and 32c of electron tubes 30 and 32 are connected to timing circuitry, including, for grid 30c, resistor 50 and capacitor 52, and for grid 32c, resistor 54 and capacitor 56. One end of resistors 50 and 54 is connected to a center tap 48a of primary winding 48. Additionally, a resistor 58 and p-n diode 60 are associated with electron tube 30, and serve a reverse-voltage blocking function. Similarly, a resistor 62 and p-n diode 64 are associated with electron tube 32, and serve a reverse-voltage blocking function. As is known, a p-n diode may be replaced with other types of one-way current valves.

An important design consideration for a high voltage inverter in accordance with the present invention is the design of transformer 19 (FIG. 1). Unlike conventional inverter circuits, transformer 19 may likely be a step-down or possibly a 1:1 transformer, built for operation at high voltages.

There are also inverter topologies that do not require transformers. Elimination of the transformer is desirable to reduce cost and expedite manufacture of an inverter, but, from a safety perspective, the presence of a transformer for isolation is not only desirable, but often is mandatory. The decision of which topology to use would be made by a power company and any architect engineer for the power company.

2. Inverter with Phase Synchronization and, Optionally, Phase Monitoring and Power Balancing of an Electrical Power Distribution Grid In contrast to single phase 20 of high voltage inverter 10 of FIG. 1, an alternative inverter can have multiple phases, such as in inverter 70 of FIG. 3A that includes the three phases 86, 88 and 90. Alternative inverters according to the present invention may have other numbers of AC output phases, such as six or twelve AC output phases, for instance. Appropriate phase control circuitry is described below for assuring the required synchronization of various phases to an electrical power distribution grid, and phase angle separation between phases when not connected to such a grid.

Optionally, a multi-phase high voltage inverter of the present invention can beneficially incorporate phase monitoring and power balancing on an electrical power distribution grid in which it is connected, wherein the power balancing occurs in a nearly instantaneous fashion (e.g., in microseconds).

Figure 3A:
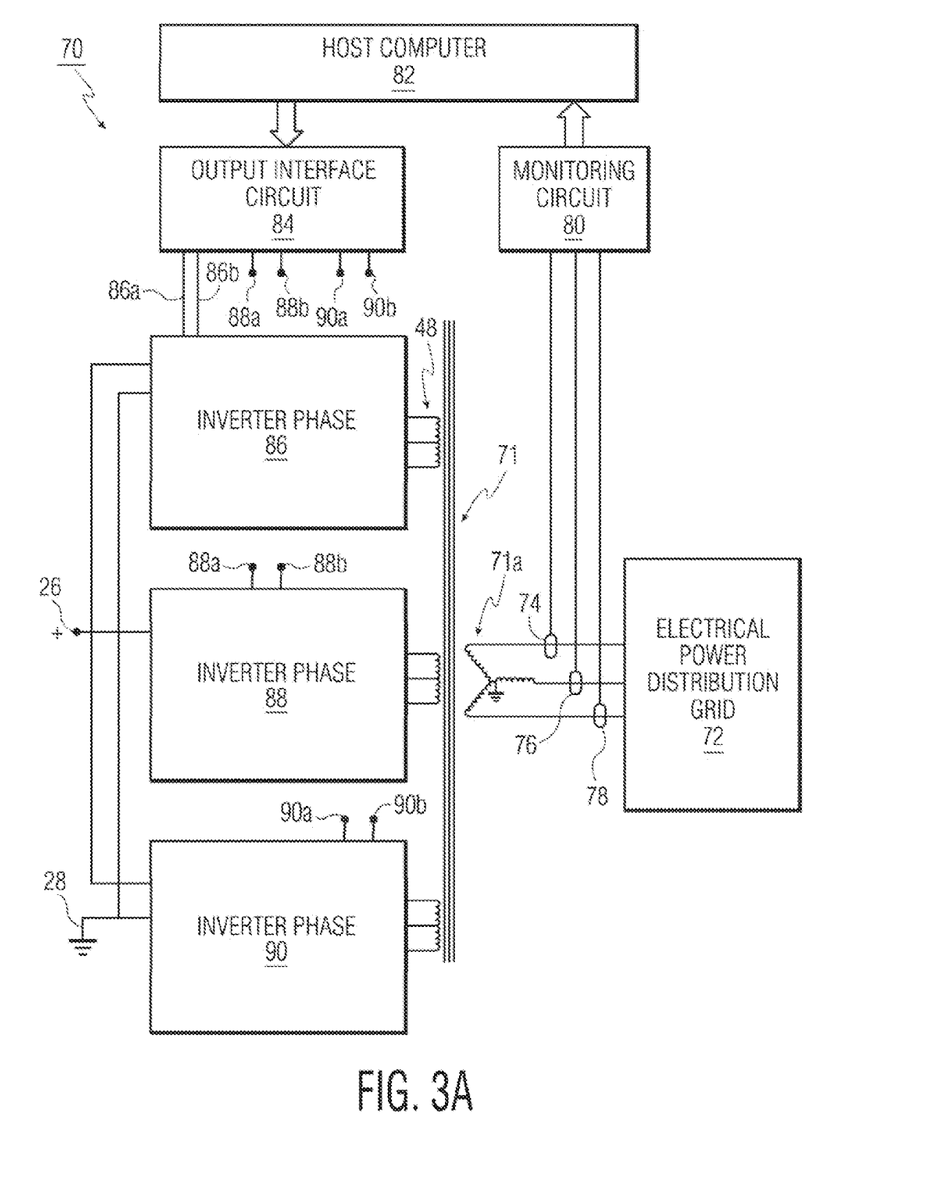
FIG. 3A is a schematic diagram, partly in block form, of a three-phase inverter with phase monitoring and power balancing in accordance with an aspect of the present invention.

FIG. 3A shows such an inverter 70, as now described, that achieves synchronization to an electrical power distribution grid and optionally power balancing on such a grid. Inverter 70 includes an output transformer 71 with output, wye-connected windings 71a. Delta-connected windings could be used instead.

Figure 3B:
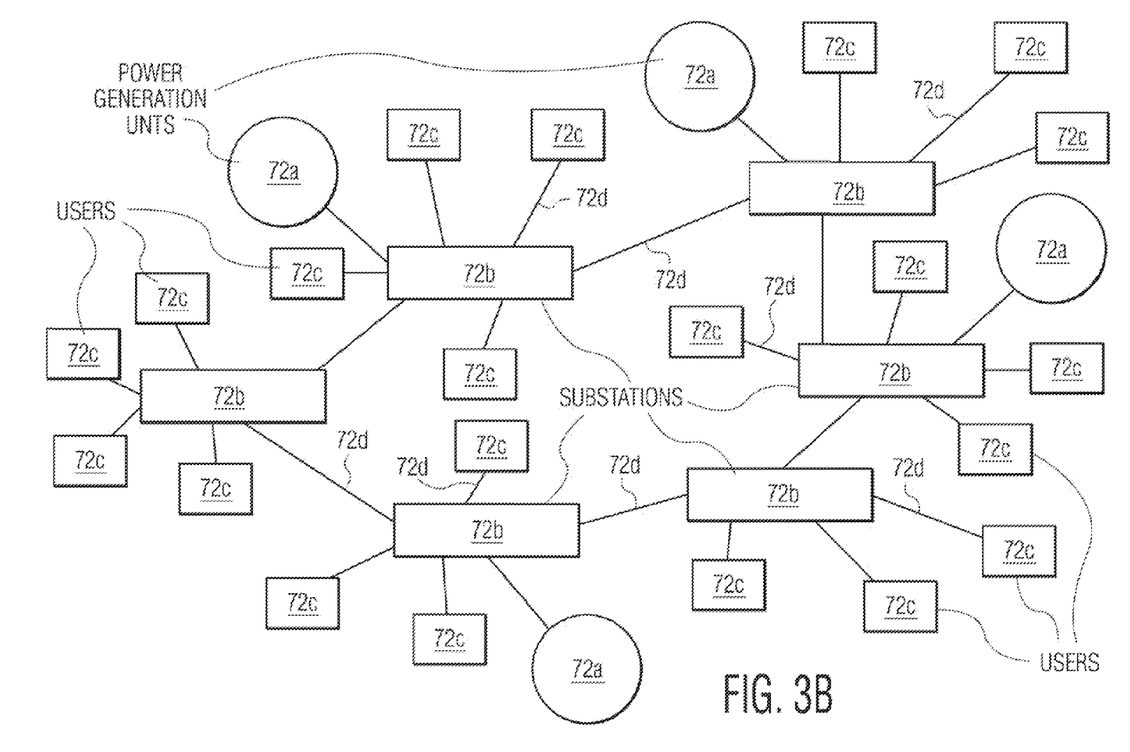
FIG. 3B is a schematic diagram, partly in block form, of an electrical power distribution grid.

In order to generate a 3-phase AC output from a single incoming HVDC source as in inverter 10 of FIG. 1, it is necessary to generate 3 clock signals (not shown) that are 120° out of phase with each other. These signals must be phase synchronized to the electrical power distribution grid attached to the output. Such an electrical power distribution grid is shown in FIG. 3A as block 72 and as further detailed in FIG. 3B. FIG. 3B shows a plurality of power generation units 72a, a plurality of substations 72b, and a plurality of users 72c. The present high voltage inverter 70 of FIG. 3A could implement one or more of power generation units 72a. Substations 72b direct electrical energy to users 72c via distribution lines 72d, only some of which are numbered.

To accomplish phase synchronization to the electrical power distribution grid, phase transducers 74, 76 and 78 continuously monitor the loading and phase angle of each phase attached to the electrical power distribution grid 72. For instance, the current monitors may provide control signals that are proportional to the power balance of the distribution grid. Monitoring circuit 80 produces a set of three signals corresponding to the instantaneous conditions of the phases of the electrical power distribution grid 72. These signals are fed into a host computer 82, where they are digitized and fed into separate buffers (not shown) for subsequent use.

The host computer 82 has an output interface circuit 84 containing components for various control circuitry, to be described below, and sets the phase angle for each of inverter phases 86, 88 and 90. As further discussed below, output interface circuit 84 can optionally control the amount of energy allowed to pass through the respective inverter for each phase.

If inverter 70 of FIG. 3A is not connected to an electrical power distribution grid, host computer 82 will cause output interface circuit 84 to transmit signals to inverter phases 86, 88 and 90 to set the phase angle of each at 120° apart from each other. Circuit 84 transmits such signals to the inverter phases via control lines 86a, 86b, 88a, 88b, and 90a, 90b.

On the other hand, if inverter 70 of FIG. 3A is connected to electrical power distribution grid 72, the default mode of host computer 82 is to cause output interface circuit 84 to transmit signals to inverter phases 86, 88 and 90 to synchronize inverter phases 86, 88 and 90 to the phases of the grid 72.

In accordance with a preferred aspect of the invention, it is desirable that control circuitry be used to rapidly distribute the incoming energy across the three phases in response to changes in the phase loading of the grid. This can be of enormous benefit to the maintenance of the electrical power distribution grid and equipment protection on the grid.

Rapid changes to distribution of power to the AC output phases can be accomplished by inverter 70 (FIG. 3A). The host computer 82 has an output interface circuit 84 containing components for various control, to be described below, which controls the amount of energy allowed to pass through the respective inverter for each phase. As mentioned above, phase transducers 74, 76 and 78 continuously monitor the loading and phase angle of each phase attached electrical power distribution grid 72, and can thus determine the differences in phase loads between each of the three phases on the electrical power distribution grid.

For balancing power of the output AC phases, a simple computer program in host computer 82 performs the following algorithm:

1. Examine the phase values in all three buffers mentioned above and relating to the power balance of the distribution grid.
2. If the values are equal, then cause output interface circuit 84 to send identical signals, separated by 120° in phase, to each of the three output stages.
3. If the input buffer values are not equal, then send an increasing amount of energy into the buffer(s) with low values until the three buffers have equal values The foregoing algorithm can be implemented in any of a number of programming languages. The choice of language is determined by the selection of the host computer and operating software. It is also possible to implement this algorithm in firmware as a set of conventional analog negative feedback control circuits. There are many suitable topologies for such firmware that will be obvious to persons of ordinary skill in the art based on the present disclosure. It is easier to implement this system with a digital computer, but it is more reliable to implement it with a firmware design.

Figure 4:
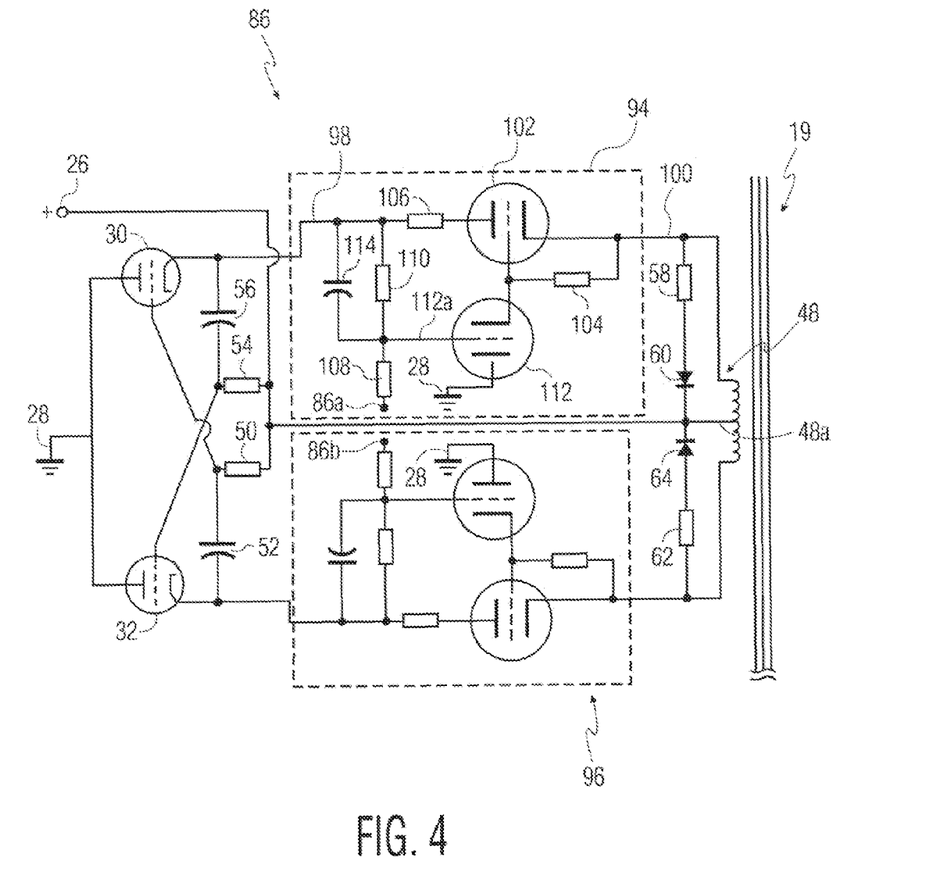
FIG. 4 is a schematic diagram of inverter phase 86 of the inverter of FIG. 3A.

FIG. 4 shows one circuit that may implement inverter phase 86 of inverter 70 of FIG. 3A. In FIG. 4, a modulation circuit 94 receives a control signal on node 86a from output interface circuit 84 of FIG. 3A. Similarly, a modulation circuit 96 receives a control signal on node 86b from output interface circuit 84 of FIG. 3A. Modulation circuits 94 and 96 are preferably symmetrical to each other, and therefore a description of only circuit 94 is provided herein.

Figure 5:
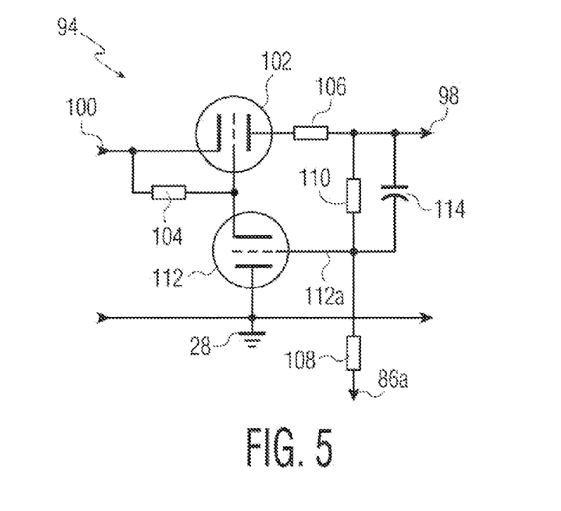
FIG. 5 is schematic diagram of a current-adjusting circuit of the inverter phase shown in FIG. 4.

Modulation circuit 94 is connected to nodes 98 and 100. FIG. 5 shows modulation circuit 94 of FIG. 4, but with nodes 98 and 100 oriented in a horizontally opposite direction from that shown in FIG. 4. This is so that circuit behavior of circuit 94 in FIG. 5 can be analyzed from left to right, for convenience.

Modulation circuit 4 of FIG. 5 is somewhat analogous to the classic FET (Field Effect Transistor) current regulator found in low voltage power supplies. The problem addressed by modulation circuit 94 is that there are no solid state or conventional vacuum tube devices that are capable of operating in the voltage or current regimes contemplated for this design. Accordingly, switching device 102 preferably is a cold cathode field emission controllable electron tubes of triode, tetrode or pentode structure. Switching device 102 may have the geometrical structure shown in FIG. 2 and as further described in above-mentioned U.S. Pat. No. 4,950,962. Alternatively, switching device 102 may comprise a high voltage semiconductor device such as a thyristor. Control device 112 may be implemented in the same way as switching device 102 to reduce diversity of parts required, or could be implemented by a device with relatively lesser voltage and current requirements.

In modulation circuit 94 of FIG. 5, the following description of operation assumes a positive voltage source on input node 26 of FIG. 4. A resistor 104 establishes a bias voltage for the grid of electron tube 102, which functions as a series current regulator. Electron tube 102 is functionally analogous to a FET in this circuit. The current flowing from tube 104 flows through a shunt resistor 106 so as to develop a voltage across such resistor 106. This voltage is fed through a voltage divider comprised of resistors 108 and 110. Grid 112a of control tube 112 is connected to the junction of resistors 108 and 110. A control voltage is applied to the other side of resistor 108; that is, on node 86a. The ratio between the voltage of shunt resistor 106 and the reference voltage on node 86a determines the degree of conduction of control tube 112, which, in turn, controls the conduction of electron tube 102. Capacitor 114 establishes a time constant with resistor 108 to ensure that the circuit stays in conduction up to the zero-crossing point. By adjusting the values of the reference voltage on node 86a and the resistor values of voltage divider 108 and 110, different current-regulation modes can be implemented. As mentioned above, the reference voltage on node 86a is provided by output interface circuit 84 of FIG. 3A.

Modulation circuit 94 can easily regulate the power balance among respective output phases to a very high degree of an average power across the three AC output phases, for instance, to at least about 1 percent of an average power across the three AC output phases. This is in addition to synchronizing the phases of the output to windings 71a of inverter 70 of FIG. 3A as described above.

Although only AC input phase 86 of FIG. 3A has been described in detail above, AC input phases 88 and 90 of FIG. 3A are preferably identical to input phase 86, and so a detailed description of phases 88 and 90 is unnecessary. However, it will be noted that, rather than receiving control signals from output interface circuit 84 on nodes 88a and 88b, input phase 88 receives control signals on nodes 88a and 88b from output interface circuit 84; and similarly input phase 90 receives control signals on nodes 90a and 90b from output interface circuit 84.

3. High Voltage DC to DC Inverter

Figure 6:
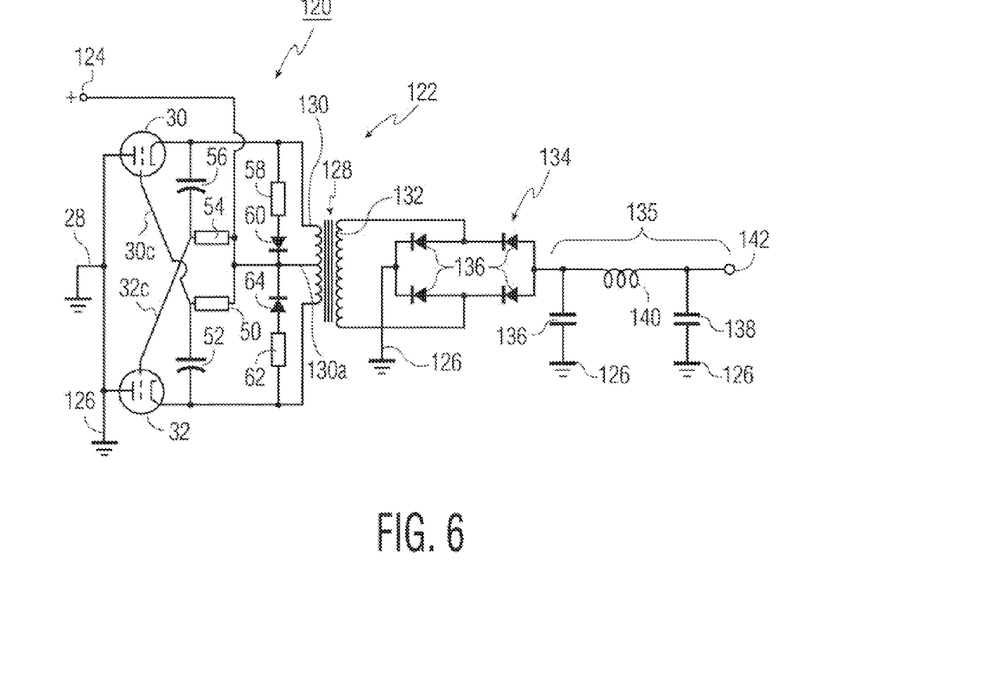
FIG. 6 is a schematic diagram of a high voltage inverter and an AC to DC rectifier for providing a high voltage DC output.

FIG. 6 shows a high voltage DC to DC inverter 120 with an input phase 122 similar to input phase 20 of FIG. 1, and therefore sharing with input phase 120 common numbering of similar parts. DC to DC inverter 120 has a positive DC input on node 124 with respect to a ground 126. A transformer 128 has a primary winding 130 with a center tap 130a. A secondary winding supplies AC voltage to an AC to DC converter, which may include a full-bridge rectifier 134 with p-n diodes or other one-way current valves 136 interconnected as shown. Output polarity of rectifier 134 can be reversed by reversing the polarities of the p-n diodes shown. The output of full-wave rectifier 134 is filtered by a filter circuit 135 that may comprise capacitors 136 and 138 and inductor 140 interconnected as shown. Full-bridge rectifier 134 and filter 135 provide AC to DC conversion. Output node 142 of filter circuit 135 provides a DC voltage that differs from the DC voltage on input node 124. Other circuits for accomplishing AC to DC conversion will be obvious to those of ordinary skill in the art based upon the present disclosure.

Figure 7:
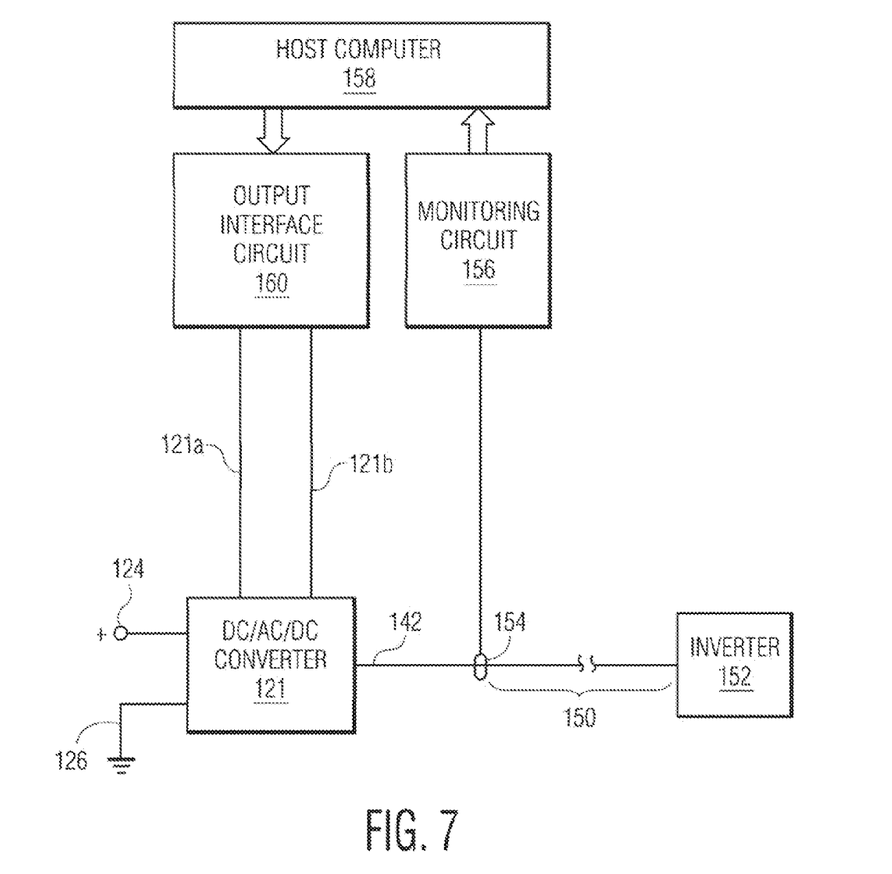
FIG. 7 is a schematic diagram, partly in block form, of the high voltage inverter and AC to DC rectifier of FIG. 6 when connected to an electrical power distribution grid.

DC to DC inverter 120 of FIG. 6 may be modified to become an inverter 121, as described below, and, by way of example, used to deliver HVDC power across an HVDC transmission line 150 to a DC to AC inverter 156 as shown in FIG. 7. When so connected to HVDC transmission line 150, it may be desirable to modulate the power provided by inverter 121 into the grid. Therefore, the power supply circuit of FIG. 7 may be used.

In FIG. 7, output 142 of inverter 121 provides DC power to HVDC transmission line 150, for transmission to a DC to AC inverter 156, for instance. A transducer 154 sends to monitoring circuit 156 signals relating to either or both current and voltage on HVDC transmission line 150. In turn, monitoring circuit 156 sends signals relating to either or both current and voltage in the grid to a buffer in the host computer 158. An output interface circuit 160 provides control signals via lines 121a and 121b to inverter 121, to cause the power delivered to the grid 150 to be stabilized.

As mentioned above, DC to DC inverter 120 of FIG. 6 is modified to become inverter 121 of FIG. 7 for connection to a HVDC transmission line 150. In particular, inverter 121 could have an AC input circuit as shown in FIG. 4 for inverter phase 86 of inverter 70 of FIG. 3A. The above description of modulation circuit 94 of FIG. 4 in relation to FIG. 5 would apply with respect to regulation of current provided to transformer 19. This process of output control is directly analogous to that described in connection with FIGS. 4 and 5. However, for the DC to DC inverter of FIG. 7, the following additional qualifications would apply: The voltage on HVDC transmission line 150 is monitored so as to control the voltage on the transmission line; this contrasts with monitoring AC current and controlling AC current when interconnected to an AC electrical power distribution grid (e.g., FIG. 3B).

The foregoing describes a high voltage inverter including the function of converting DC power to AC power that can have a low number of parts, exhibits high reliability, and is not environmentally dangerous.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A high voltage inverter for converting DC input power to three or more AC output phases with individual current control of each output phase, comprising:
   a) each AC output phase having an AC input phase circuit comprising:
      i) first and second cold cathode field emission controllable electron tubes of triode, tetrode or pentode structure;
      ii) a primary transformer winding having a first end, a second end, and a center tap;
      iii) the center tap being connected to a DC potential in excess of 20 KV;
      iv) the first electron tube being serially connected between the first end of the primary winding and the ground, and the second electron tube being serially connected between the second end of the primary winding and the ground; and
      v) the conduction state of each electron tube being controlled to convert from DC power at a potential in excess of 20 KV to AC power via said primary transformer winding; the first and second electron tubes alternately conducting so as to alternately bring the first end of the primary winding approximately to the potential of the ground and then bring the second end of the primary winding approximately to the potential of the ground;
   b) for each AC input phase primary winding, a respective secondary winding of an associated AC output phase coupled thereto; each primary winding and associated secondary winding forming a multi-phase transformer;
   c) means for adjusting the current in each individual phase, comprising:
      i) means for determining voltage, current and phase angle in each AC output phase, and
      ii) current-control means, responsive to said means for determining, for controlling the current level of each output phase in a continuously variable manner; the current-control means including a third cold cathode field emission controllable electron tube serially connected between the first electron tube and the primary winding, and a fourth cold cathode field emission controllable electron tube serially connected between the second electron tube and the primary winding.

2. The inverter of claim 1, wherein;
   a) the inverter includes means for connecting the AC output phases to an electrical power distribution grid having a plurality of power generators and a plurality of substations for distributing power to users; and
   b) the current-adjusting means regulates the power balance among individual output phases to a degree of at least about 1 percent of an average power among the plurality of AC output phases.

3. The inverter of claim 1, wherein the first, second, third and fourth electron tubes each comprises:
   a) an elongated cylindrical cold cathode;
   b) an elongated cylindrical anode; and
   c) a cylindrical grid which acts as a gate interposed between said cathode and said anode;
   d) said anode being axially symmetric to and encircling said cathode and said grid.

4. The inverter of claim 1, wherein:
   a) the first, second, third and fourth cold cathode field emission electron tubes each has first and second main current-carrying electrodes; and
   b) the inverter is free of any other cold cathode field emission electron tubes connected in parallel with said first, second, third or fourth cold cathode electron tube.

5. The inverter of claim 1, wherein the primary and secondary transformer windings are configured to produce a voltage on the secondary windings of at least 10 KV.

6. A high voltage DC to DC converter with output current control, comprising:
   a) an AC input phase circuit comprising:
      i) first and second cold cathode field emission controllable electron tubes of triode, tetrode or pentode structure;
      ii) a primary transformer winding having a first end, a second end, and a center tap;
      iii) the center tap being connected to a DC potential in excess of 20 KV;
      iv) the first electron tube being serially connected between the first end of the primary winding and the ground, and the second electron tube being serially connected between the second end of the primary winding and the ground; and
      v) the conduction state of each electron tube being controlled to convert from DC power at a potential in excess of 20 KV to AC power via said primary transformer winding; the first and second electron tubes alternately conducting so as to alternately bring the first end of the primary winding approximately to the potential of the ground and then bring the second end of the primary winding approximately to the potential of the ground;
   b) an output AC phase including a secondary transformer winding coupled to the primary transformer winding;

c) an AC to DC rectifier for converting the output voltage from the secondary transformer winding to an output high DC voltage in excess of 50 KV;
d) means for regulating the output power of the DC to DC converter that is supplied to an HVDC transmission line to a degree of at least about 1 percent of an average power level; the means for regulating comprising:
   i) means for determining voltage and current in the output high voltage DC; and
   ii) current-control means, responsive to said means for determining, for controlling the power level of the output of the DC to DC converter in a continuously variable manner; the current-control means including a third cold cathode field emission controllable electron tube serially connected between the first electron tube and the primary winding, and a fourth cold cathode field emission controllable electron tube serially connected between the second electron tube and the primary winding.

7. The converter of claim 6, wherein:
a) the first, second, third and fourth cold cathode field emission electron tubes each has first and second main current-carrying electrodes; and
b) the converter is free of any other cold cathode field emission electron tubes connected in parallel with said first, second, third or fourth cold cathode electron tube.

* * * * *

UNITED STATES PATENT AND TRADEMARK OFFICE
CERTIFICATE OF CORRECTION

| | | |
|---|---|---|
| PATENT NO. | : 7,916,507 B2 | Page 1 of 1 |
| APPLICATION NO. | : 12/359198 | |
| DATED | : March 29, 2011 | |
| INVENTOR(S) | : Curtis A. Birnbach | |

It is certified that error appears in the above-identified patent and that said Letters Patent is hereby corrected as shown below:

Column 2
Line 63, "High voltage inverter 10 Fig. 1 preferably uses the fore-" should read --High voltage inverter 10 in Fig. 1 preferably uses the fore- --

Column 3
Line 29, "in FIG., the DC input voltage appears between node 26 and" should read --In FIG. 1, the DC input voltage appears between node 26 and--

Column 6
Line 63, "transmission line 150 to a DC to AC inverter 156 as shown in" should read --transmission line 150 to a DC to AC inverter 152 as shown in--

Column 7
Line 3, "inverter 156, for instance. A transducer 154 sends to moni-" should read --inverter 152, for instance. A transducer 154 sends to moni- --

Signed and Sealed this

Fourteenth Day of June, 2011

David J. Kappos
*Director of the United States Patent and Trademark Office*